United States Patent [19]

Kobayashi et al.

[11] 4,186,272
[45] Jan. 29, 1980

[54] CODE GENERATOR

[75] Inventors: Toshihiko Kobayashi, Musashino; Tetsusaburo Kamibayashi, Niza, both of Japan

[73] Assignee: Kokusai Denshin Denwa Kabushiki Kaisha, Japan

[21] Appl. No.: 894,518

[22] Filed: Apr. 7, 1978

[30] Foreign Application Priority Data

Apr. 11, 1977 [JP] Japan .................................. 52-40301

[51] Int. Cl.$^2$ ............................................ G08C 21/00
[52] U.S. Cl. ..................................................... 178/19
[58] Field of Search ............................ 178/18, 19, 20; 179/90 B, 110 C; 340/11, 17, 347 AD; 33/1 M; 181/111, 112, 125

[56] References Cited

U.S. PATENT DOCUMENTS

| | | | |
|---|---|---|---|
| 3,806,642 | 4/1974 | Veith et al. | 178/19 |
| 3,846,580 | 11/1974 | Brenner | 178/19 |
| 3,904,821 | 9/1975 | Whetstone et al. | 178/19 |
| 3,956,588 | 5/1976 | Whetstone et al. | 178/19 |
| 4,018,989 | 4/1977 | Snyder et al. | 178/19 |
| 4,143,240 | 3/1979 | Kobayashi et al. | 178/19 |

Primary Examiner—Thomas A. Robinson
Attorney, Agent, or Firm—Robert E Burns; Emmanuel J. Lobato; Bruce L. Adams

[57] ABSTRACT

A code generator which has a plurality of selectable areas on an information plane of an information plate formed with a magnetostrictive material. At least one exciting winding is wound on the information plate at one end thereof for causing at least one magnetostrictive oscillation wave in the magnetostrictive material. A plurality of detecting windings are arranged on the information plate in parallel with the exciting winding to divide the information plane into a plurality of small areas. An information designating detector is pressed against a desired one of the plurality of the small areas. Coded information indicative of a desired one of the small areas is obtained in correspondence to the number of output pulses induced from the plurality of detecting windings until a detected pulse is obtained from the information designating detector by the magnetostrictive oscillation wave resulting from pulse excitation by the exciting winding and propagated in the magnetostrictive material.

8 Claims, 10 Drawing Figures

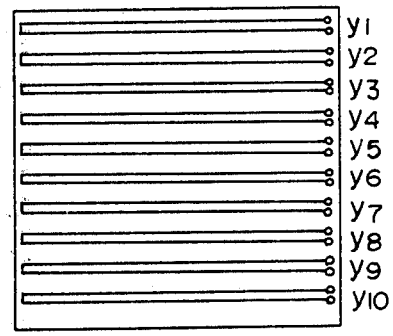
Fig. 4A
Fig. 4B
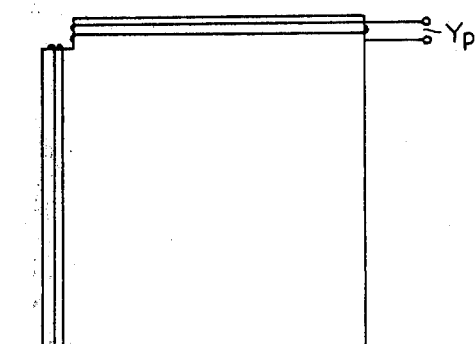
Fig. 4C
Fig. 4D
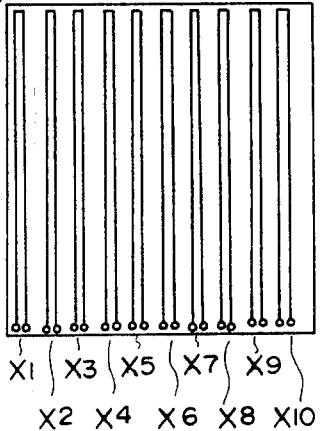

CODE GENERATOR

BACKGROUND OF THE INVENTION

This invention relates to a code generator for generating a code signal in response to a selection operation on a board.

A variety of devices of this kind have been heretofore proposed besides a keyboard device using an arrangement of many electrical switches. However, they are difficult to produce with high density, and hence have the defects of appreciable bulkiness and high manufacturing cost.

SUMMARY OF THE INVENTION

An object of this invention is to provide a code generator which permits a number of selectable areas to be accommodated in a small space and which can be obtained at low cost.

In accordance with this invention, a code generator is responsive to the designation of a desired one of a plurality of selectable areas on an information plate formed with a magnetostrictive material to generate code information corresponding to the designated area in the form of an electric signal.

BRIEF DESCRIPTION OF THE DRAWINGS

This invention will be described in detail with reference to the accompanying drawings, in which:

FIGS. 4A, 4B, 4C and 4D are plan views explanatory of the construction of the information plate employed in this invention.

DESCRIPTION OF THE PREFERRED EMBODIMENT

Figure 1:
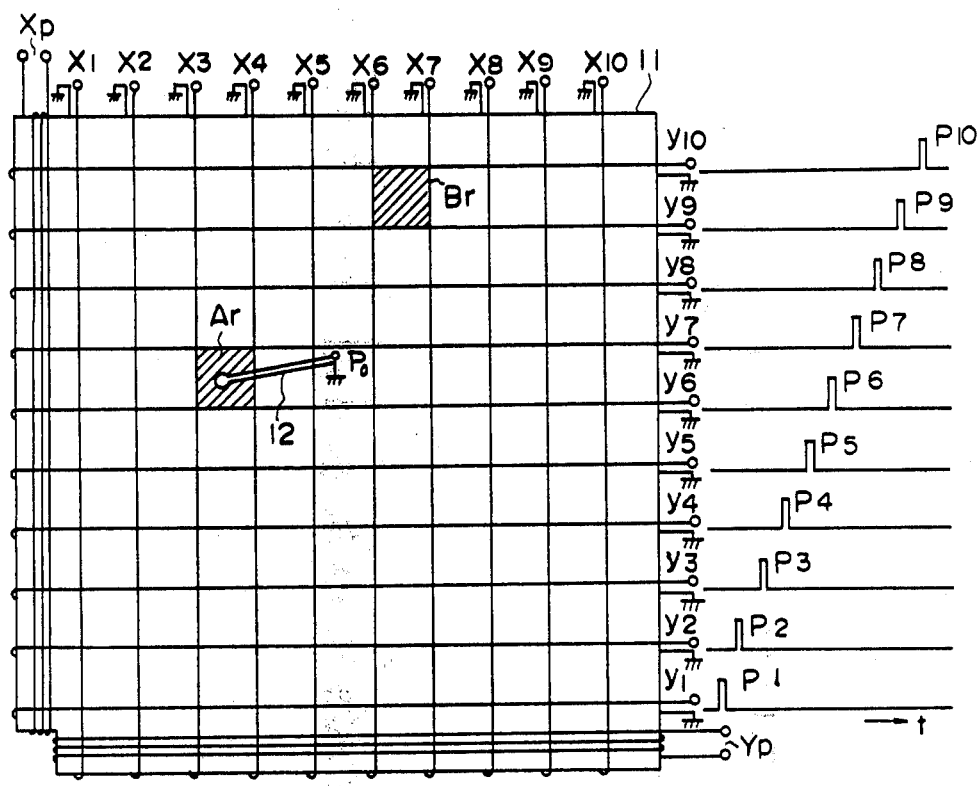
FIG. 1 is a plan view illustrating an information plate employed in this invention.

The operating principles of this invention will be first described with reference to FIG. 1, illustrating the construction of an information plate embodying the invention. The information plate comprises, as shown, a magnetostrictive thin plate 11, and Y- and X-direction exciting lines $Y_p$ and $X_p$ wound thereon, and Y-direction detection lines $y_1$ to $y_{10}$ and X-direction detecting lines $x_1$ to $x_{10}$ respectively wound on the thin plate 11 at regular intervals to intersect or cross each other at right angles. Upon occurrence of magnetostrictive oscillation in response to the application of a pulse current applied to the exciting line $Y_p$, the oscillation wave is propagated in the magnetostrictive thin plate 11 in a direction perpendicular to the exciting line $Y_p$ at a velocity of about 5000 meters/second. In this instance, pulses $P_1$ to $P_{10}$ are induced in the Y-direction detecting lines $y_1$ to $y_{10}$ one after another with a delay time corresponding to the detecting line spacing. The same may be said for the X-direction. Accordingly, in a case where an information designating detector 12 is placed, for example, on an area $A_r$, a pulse $P_o$ is obtained from the detector 12 at a time interval between the pulses $P_6$ and $P_7$ in the Y-direction, so that if the pulses ($P_7$ to $P_{10}$) occurring after the pulse $P_o$ are suppressed by the abovesaid pulse $P_o$, six pulses $P_1$ to $P_6$ are obtained from the Y-direction detecting lines $y_1$ to $y_6$ and which indicate the position of the detector 12 in the Y-direction. Similarly, three pulses $P_1'$ to $P_3'$ (not shown) are obtained from the X-direction detecting lines. As a result of this, pulse trains of (3, 6) pulses, respectively, are obtained as the X and Y co-ordinates of the area $A_r$. In the same manner, pulse trains (6, 9) are obtained by designating or selecting an area $B_r$. In FIG. 1, an 11 cm (centimeters)×11 cm information plate is divided by the X-direction detecting lines and the Y-direction detecting lines at intervals of 1 cm, and hence is capable of generating pulses indicative of one hundred pieces of information from selectable areas 1×1 to 10×10.

The pulse trains obtained from respective areas may be outputted after being translated into predetermined information, or may also be used as they are.

In any case of requring analog signals of different voltage levels as the outputs, the pulse trains derived from this invention are integrated by means of an integrator provided as an additional circuit.

In a case where the number of pieces of information to be outputted is small, the exciting lines and the detecting lines of either the Y or X direction may be eliminated.

Figure 2A:
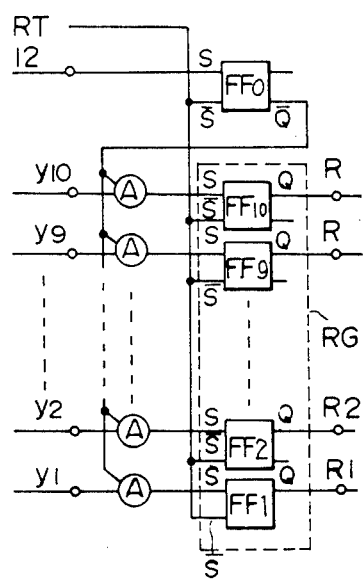
FIGS. 2A, 2B, 2C and 2D are block diagrams illustrating examples of output circuits employed in this invention.
Figure 2D:
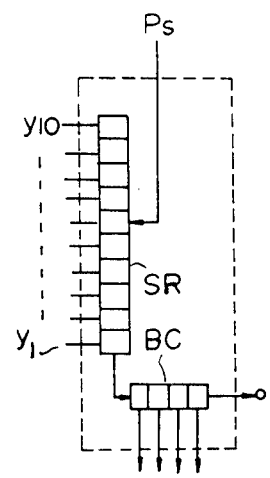
Figure 2B:
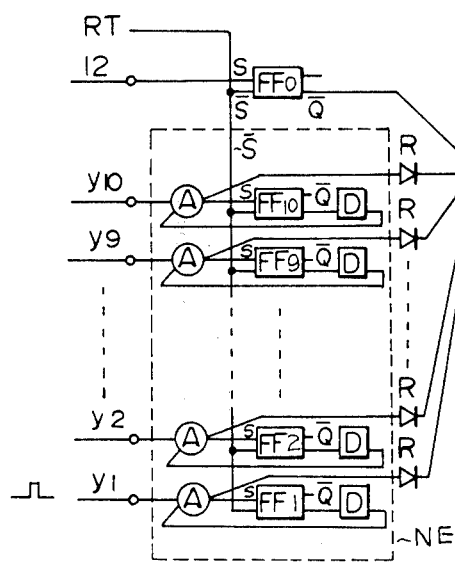
Figure 2C:
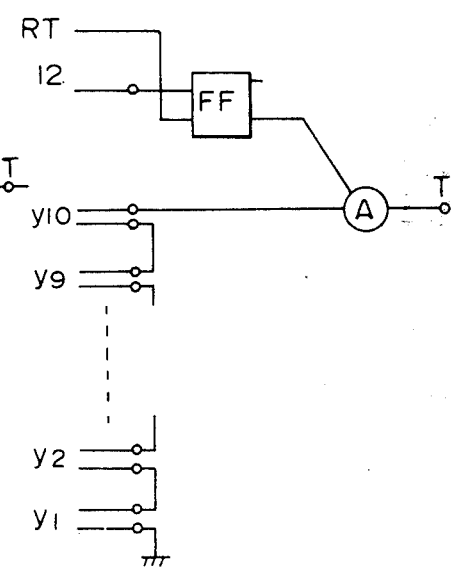

FIGS. 2A, 2B and 2C show examples of output circuits connected to the Y-direction detecting lines $y_1$ to $y_{10}$ or the X-direction detection lines $x_1$ to $x_{10}$, respectively. FIG. 2A is a circuit for obtaining output pulses in parallel format and each of FIGS. 2B and 2C is a circuit for providing a serial output pulse train. A binary-code signal can be obtained, in the circuit of FIG. 2A, by employing structure in which a register RG indicated by a dotted line is replaced by a shift register SR and a binary counter BC is combined therewith, as shown in FIG. 2D. In the circuits of FIGS. 2B and 2C, the same purpose can be easily achieved by connecting a binary counter to an output terminal T. In FIG. 2B, a circuit NE enclosed by a dotted line and composed of AND gates A, flip-flops $FF_1$ to $FF_{10}$ and delay circuit D is provided to eliminate the influence of noises resulting from an echo of the magnetostrictive oscillation. This circuit can be omitted if means is provided for completely absorbing the magnetostrictive oscillating waves by fixing the magnetostrictive thin plate 11 at its peripheral portions using an adhesive binder. Alternatively, the detecting lines $y_{10}$ to $y_1$ may be connected in series, as shown in FIG. 2C or in parallel as obtained by eliminating the circuit NE in FIG. 2B. In any event, the circuit structure can be markedly simplified by the removal of reflection noises. In FIGS. 2A, 2B, 2C and 2D, reference character R indicates rectifiers; input terminals S and $\overline{S}$ of each flip-flop FF identify set and reset input terminals, output terminals Q and $\overline{Q}$ refer to set and reset output terminals; RT shows a reset pulse; and $P_s$ indicates shift pulses. A flip-flop $FF_o$ is employed to suppress output pulses after the pulse $P_o$ from the information designating detector 12.

It is preferred that the magnetostrictive thin plate be fromed of a material having a large coefficient of magnetostriction, such as an Ni- or Fe-Co system alloy or an Ni-Fe-Co system alloy. A method of manufacturing the magnetostrictive thin plate is to exfoliate after rolling or electroplating but it may also be obtained by forming a magnetostrictive material layer on a substrate of copper. The thickness of the magnetostrictive plate is preferred to be 3 microns or more. A smaller thickness reduces the detected output, and too large a thickness, such as more than one milli-meter requires a large exciting power for generating magnetostrictive oscillation. In a case of the magnetostrictive plate made by exfoliating after electroplating, the output is increased about ten times by a heat treatment at 500° C. for 30 minutes or longer.

The above description has been given only in connection with a case where the magnetostrictive material is used in the form of a thin plate but it is also possible to employ such a structure in which a number of magnetostrictive material strips are disposed in a matrix form on one substrate to extend in parallel in the X and Y directions, respectively.

Further, it is better to provide magnetic shielding around each exciting line by the use of a flux keeper of a magnetic substance. This ensures prevention of the exciting energy from leaking directly to the detecting lines or the detector 12 to generate noises.

Figure 3:
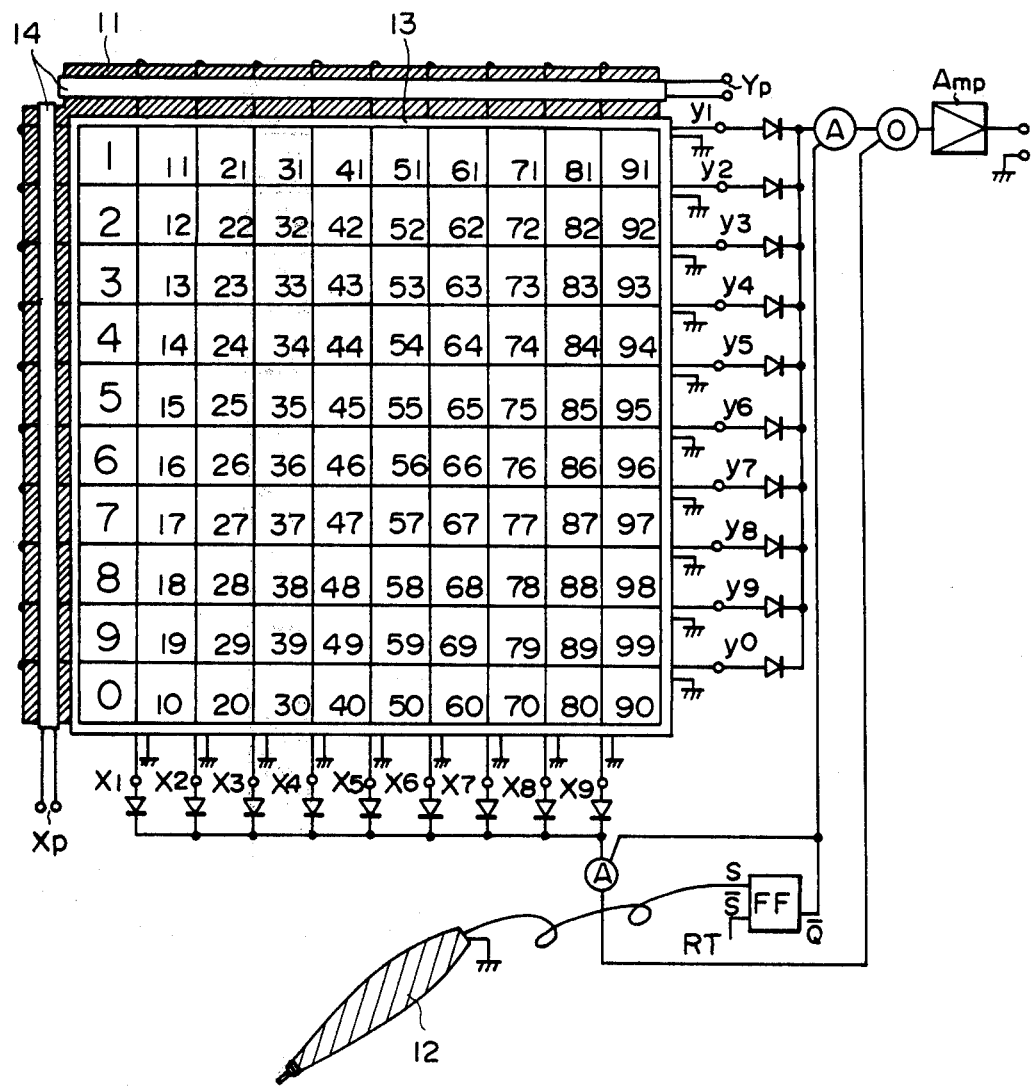
FIG. 3 is a schematic diagram illustrating an embodiment of this invention.

FIG. 3 shows the structure of the information plate of this invention applied to an automatic dial signal generator for a telephone set. On the magnetostrictive thin plate 11 are mounted the X-direction exciting lines $X_p$ and the Y-direction exciting lines $Y_p$, each magnetically shielded by a flux keeper 14, and windings of X-direction detecting lines $x_1$ to $x_9$ and Y-direction detecting lines $y_1$ to $y_{10}$, as illustrated. A letter plate 13 is mounted on the magnetostrictive thin plate 11, so that the detecting lines $x_1$ to $x_9$ and $y_1$ to $y_{10}$ form the boundary lines of small selectable areas 0 to 99. A pickup coil and a push switch are incorporated at the top end portion of the information designating detector 12. Pressing the top of the detector 12 against the letter plate 13 at one of the selectable areas where the name of a person (written by a user of the telephone set) desired to be called is indicated, after a handset of a telephone set (not shown) is hooked-off, the push switch is turned ON to apply a current to the exciting lines $X_p$ and $Y_p$ in this order under the control of a control circuit (not shown), so that a serial pulse train corresponding to the selected area desired to be called is generated. These output pulses can be made by a waveform shaping circuit using a monostable multivibrator or the like to have the same waveforms as telephone dial pulses. Accordingly, when these output pulses are applied to a telephone line, the called telephone set is selected by an exchange. That is, in cases of conventional devices, it is necessary to dial the called party's telephone number, whereas in the present invention it is sufficient only to press the detector 12 against the letter plate 13 at the place where the called party's name is written. The leftmost column on the letter plate 13 is used for central office lines. A central office line can be called by successively pressing selectable areas "1" to "0" so as to indicate the called party's telephone number after a dialling "0" of the office line call as in the case of usual dialling operations. For providing a function like the so-called abbreviated dialling, called party's numbers are each stored in a memory which uses, as addresses, numbers corresponding to the respective selectable areas, and are read out by the area number of a selected area.

For instance, when each area has an area of 0.5 cm×0.5 cm in a case of a 16 cm×16 cm letter plate, 1024 pieces of number information can be outputted. If a greater quantity of information is required, a plurality of letter plates are prepared and selectively exchanged, or a plurality of information plates are prepared and bound in the manner of a loose-leaf notebook. In any case, it is necessary to provide a mechanism for adding a first one digit (or digits) designating a selected one of the letter plates to the above mentioned output pulses. For example, the numerals for calling a Central Office line, provided at the leftmost end of the letter plate in FIG. 3, are made common to all of the letter plates prepared and the numerals 1 to 10 are made to correspond to the letter plates of pages 1 to 10, respectively. In most cases, this signal generator requires the information plate only and does not involve the use of a converter or a translator, and has a small and simple construction and can be activated by one operation. Besides, if the dial mechanism of a telephone set is replaced by the information plate of this invention, an entirely new telephone set is obtained.

Although each selectable area is shown to be a square having an area of 1 cm² in FIG. 3, each area can be made rectangular by changing the manner of winding of the detecting lines and the area can also be reduced to 1/5 to 1/10. However, when the areas are extremely small, the letters written therein become small, making it difficult to designate the areas. In FIG. 3, reference characters 0 and AMP identify an OR gate and a shaping amplifier, respectively.

FIGS. 4A, 4B, 4C and 4D respectively indicate a letter plate, a Y-direction detecting sheet, a magnetostrictive oscillating plate having wound thereon exciting windings $X_p$ and $Y_p$ in the X- and Y-directions and an X-direction detecting sheet. The information plate can be obtained by only placing these four sheets one on another. The sheets shown in FIG. 4B and FIG. 4D can each be produced, as shown, by selectively etching a conductive film on an insulating sheet using the photo-etching techniques.

As has been described in the foregoing, this invention provides for effectively increasing the density of information points, and hence facilitates the fabrication of portable and small devices of this kind. Accordingly, the present invention is of a particular utility when employed in an apparatus supplied with a large amount of input information such as an input device for a Chinese-character typewriter, or in the signal generator for a telephone set described above, or in the processing of various slips.

What we claim is:

1. A code generator, comprising:
    a magnetostrictive plate-like member composed of magnetostrictive material for propagating therein magnetostrictive oscillation waves;
    at least one excitation winding wound on said magnetostrictive plate-like member and receiving in use an electrical signal for exciting a magnetostrictive oscillation wave which propagates in said magnetostrictive plate-like member in a direction of propagation;
    a plurality of detecting windings wound on said magnetostrictive plate-like member for detecting a magnetostrictive oscillation wave propagating in said plate-like member and for developing respective electrical output signals in response thereto, wherein said detecting windings are each wound substantially normal to the direction of propagation of the magnetostrictive oscillation wave developed in response to energization of said excitation winding and said detecting windings are spaced at intervals along the direction of propagation for defining areas bounded by successive ones of said detecting windings and for successively developing respective electrical output signals in response to propagation of the magnetostrictive oscillation wave in the direction of propagation;

positionable detection means positionable at any selected one of the areas defined between successive ones of said detecting windings for detecting a magnetostrictive oscillation wave propagating in said plate-like member and through the selected area at which said positionable detection means is positioned and for developing an output signal in response to the detected magnetostrictive oscillation wave; and coding means responsive to the output signal of said positionable detection means and to the respective output signals of said detecting windings for developing a unique code signal corresponding to the selected area at which said positionable detection means is positioned.

2. A code generator according to claim 1, wherein a set of the exciting winding and the plurality of detecting windings is arranged in each of the X-direction and the Y-direction parallel to the ordinate and the abscissa of the orthogonal coordinates, respectively.

3. A code generator according to claim 1, wherein the magnetostrictive material is formed into the shape of a thin plate.

4. A code generator according to claim 1, wherein the exciting winding is magnetically shielded.

5. A code generator according to claim 1, wherein a plurality of said detecting windings are connected in series to one another in said coding means to provide said coded information.

6. A code generator according to claim 1, wherein a plurality of said detecting windings are connected in parallel to one another in said coding means to provide said coded information.

7. A code generator according to claim 1, wherein said coding means is responsive to the number of respective output signals developed by said detecting windings before the output signal of said positionable detection means is developed for developing an output code signal corresponding to said number of respective output signals developed by said detecting windings before the output signal of said positionable detection means is developed.

8. A code generator according to claim 1, wherein said coding means includes echo suppression means for suppressing echo signal developed by said detecting windings in response to magnetostrictive oscillation echo waves developed within said magnetostrictive plate-like member.

* * * * *